G. H. Corliss,
Piston Packing.
Nº 18,136.  Patented Sep. 8, 1857.
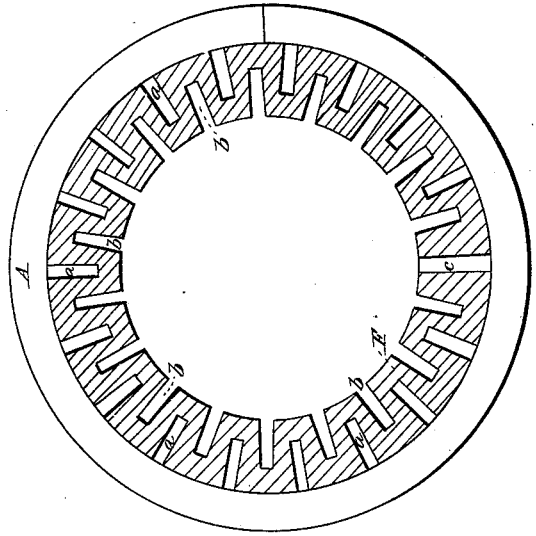
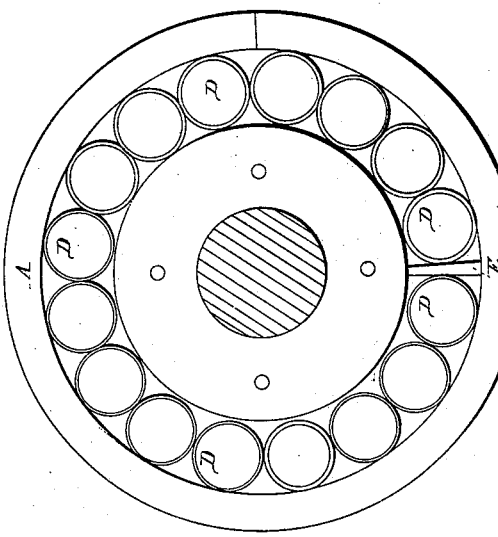
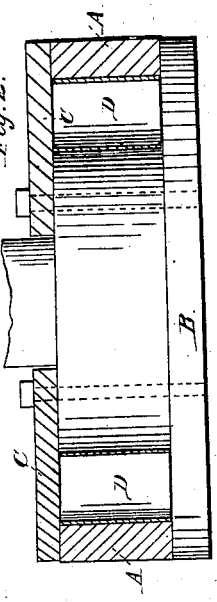

UNITED STATES PATENT OFFICE.

GEORGE H. CORLISS, OF PROVIDENCE, RHODE ISLAND.

METALLIC PACKING FOR PISTONS OF STEAM-ENGINES.

Specification of Letters Patent No. 18,136, dated September 8, 1857.

*To all whom it may concern:*

Be it known that I, GEORGE H. CORLISS, of the city and county of Providence and State of Rhode Island, have invented a new and useful Improvement in Metallic Spring-Packing for Pistons; and I do hereby declare that the following is a full, clear, and exact description of the same, reference being had to the accompanying drawing, forming part of this specification, in which—

Figure 1 is a plan of the interior of a piston with my improved spring packing. Fig. 2 is a central section of the same.

Similar letters of reference indicate corresponding parts where they are used in the different figures.

The springs employed in metallic packing for pistons should exert as nearly as possible an equal pressure in all directions radiating from the center of the piston in order to produce an equal wear on all sides of the piston and cylinder whose circular form cannot otherwise be preserved. The springs heretofore employed have been of many kinds but none of them possess the above requisite qualification in a nearly perfect degree.

This invention consists in the employment to force out the packing, of a metallic spring of circular form which is elastic in the direction of its circumference and therefore exerts a perfectly or nearly perfectly uniform outward pressure in all parts of the packing.

In carrying out my invention the body of the piston may be of the construction heretofore generally adopted as shown in Figs. 1 and 2, and I propose generally to use as packing one or more slit metallic rings of the usual construction represented in Figs 1 and 2 and indicated by A. The ring or rings are fitted in the usual manner between the fixed plate or flange B, and the movable plate or cap C, as shown in Fig. 2. The circularly elastic spring exhibited in Figs. 1 and 2 is composed of a series of rings D, D, which I generally make of drawn brass tubing arranged side by side parallel with the axis of the piston in the form of a circle and when thus arranged should fit tightly within the packing ring or rings. As it would be almost impossible with a number of small rings D, D, of equal size to make them fit exactly to the interior of the packing ring, I make the said rings D, D, of such diameter, that, when all put together in the form of a circle, they will fit very nearly to the packing ring, and I then insert between them, at one or more points in the circle, one or more thin pieces of metal of flat or slightly taper form as shown at E, Fig. 1, such piece or pieces E being fitted so tightly between the rings D, D, as to crowd them tightly together and slightly compress them against each other when in the packing ring, and when thus arranged they combine to form a circular spring which is elastic in the direction of its circumference, and consequently tends to expand itself equally in all directions radial to its center, and thus to exert an equal force at a great number of equidistant points equal to the number of the rings D, D, on the interior of the packing ring to force it outward. The spring thus constructed is but moderately elastic, thus, with its equal pressure on all sides of the packing, combining all the properties which are requisite for a packing spring. It must be admitted, however, that where the piece or pieces E, intervene between the springs, the points of pressure of the spring on the packing are not quite equidistant with the other points, but the difference in distance is so slight as to be quite immaterial. When the packing is so much worn that the spring has expanded itself circumferentially to such extent as to have lost its control over the packing, it may be expanded by the insertion of a thicker piece or pieces E, in place of the old ones, or by inserting a new piece or pieces at other points.

I am aware that springs of circular form have been employed to force out the packing rings, but such springs have in their normal condition been either straight or nearly so, and their elasticity produces merely a tendency to straighten themselves, and acts with greater force at two opposite points than at any other points of the packing ring, and these springs cannot be considered as elastic in the direction of their circumference. To the invention of such springs however I lay no claim. Nor do I claim the employment of air-vessels placed within the piston in order to assist the packing thereof, as in R. A. Stratton's device, rejected, 1851; but

What I claim as new and desire to secure by Letters-Patent, is:—

The arrangement within a piston of the cylindrical springs D, in the manner and for the purposes substantially as herein described.

GEO. H. CORLISS.

Witnesses:
JAMES F. BUCKLEY,
W. TUSCH.